US012775359B2

(12) United States Patent
Kristensson

(10) Patent No.: US 12,775,359 B2
(45) Date of Patent: Oct. 27, 2026

(54) RENDERING OF VIRTUAL KEYBOARDS IN VIRTUAL ENVIRONMENTS

(71) Applicant: Telefonaktiebolaget LM Ericsson (publ), Stockholm (SE)

(72) Inventor: Andreas Kristensson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/715,780

(22) PCT Filed: Dec. 7, 2021

(86) PCT No.: PCT/EP2021/084482

§ 371 (c)(1),
(2) Date: Jun. 3, 2024

(87) PCT Pub. No.: WO2023/104286

PCT Pub. Date: Jun. 15, 2023

(65) Prior Publication Data

US 2025/0036240 A1 Jan. 30, 2025

(51) Int. Cl.
*G06F 3/042* (2006.01)
*G06F 3/01* (2006.01)

(52) U.S. Cl.
CPC ............ *G06F 3/0426* (2013.01); *G06F 3/011* (2013.01)

(58) Field of Classification Search
None
See application file for complete search history.

(56) References Cited

U.S. PATENT DOCUMENTS 6,771,294 B1 * 8/2004 Pulli ........................ G06F 3/011 715/764
9,448,620 B2 * 9/2016 Kim ........................ G06F 3/0304
9,760,214 B2 * 9/2017 Li ........................ G06F 3/04883
9,965,028 B2 * 5/2018 Yoo ........................ G06F 3/04815
(Continued)

FOREIGN PATENT DOCUMENTS

WO 2017031089 A1 2/2017

OTHER PUBLICATIONS

"Numeric keypad", Wikipedia, Mar. 30, 2021.

*Primary Examiner* — Sarvesh J Nadkarni
(74) *Attorney, Agent, or Firm* — Murphy, Bilak & Homiller, PLLC

(57) ABSTRACT

There is provided mechanisms for providing a complementary virtual keyboard of a virtual input device in a virtual environment. The virtual input device is a virtual keyboard comprising virtual keys. A method is performed by a control device. The method comprises identifying user interaction with the virtual input device. The user interaction comprises at least one hand of the user interacting with the virtual input device in the virtual environment. The method comprises calculating a virtual representation of the user interaction with the virtual input device. The method comprises identifying, from the virtual representation, that the user interaction comprises the hand of the user is turned so that a palm side of the hand faces away from the virtual keyboard. The method comprises, in response thereto, revealing the complementary virtual keyboard for receiving user input from the user in the virtual environment.

14 Claims, 6 Drawing Sheets

(56) References Cited

U.S. PATENT DOCUMENTS

| | | | | |
|---|---|---|---|---|
| 11,169,611 | B2 * | 11/2021 | Guendelman | G06F 3/0488 |
| 2002/0021287 | A1 * | 2/2002 | Tomasi | G06F 3/04886 345/173 |
| 2007/0063979 | A1 * | 3/2007 | Tran | G06F 3/0426 345/169 |
| 2013/0016070 | A1 * | 1/2013 | Starner | G06F 3/011 345/175 |
| 2013/0113709 | A1 * | 5/2013 | Wine | G06F 1/163 345/169 |
| 2014/0028567 | A1 * | 1/2014 | Park | G06F 3/0236 345/168 |
| 2014/0359513 | A1 * | 12/2014 | Starner | G06F 3/0481 715/773 |
| 2015/0269783 | A1 * | 9/2015 | Yun | G06F 3/0304 345/633 |
| 2015/0332075 | A1 * | 11/2015 | Burch | G06F 3/04886 370/336 |
| 2017/0090747 | A1 * | 3/2017 | Dash | G06F 1/163 |
| 2017/0255320 | A1 * | 9/2017 | Kumar | G06F 3/04883 |
| 2017/0285761 | A1 | 10/2017 | Yagi | |
| 2019/0138083 | A1 * | 5/2019 | Greenberger | G06F 3/017 |
| 2019/0196591 | A1 * | 6/2019 | Long | G06F 3/04883 |
| 2020/0117282 | A1 | 4/2020 | Lee et al. | |
| 2020/0225735 | A1 * | 7/2020 | Schwarz | G06F 3/0233 |
| 2021/0034190 | A1 * | 2/2021 | Kang | H04M 1/724 |
| 2021/0065455 | A1 | 3/2021 | Beith et al. | |

* cited by examiner

RENDERING OF VIRTUAL KEYBOARDS IN VIRTUAL ENVIRONMENTS

TECHNICAL FIELD

Embodiments presented herein relate to a method, a control device, a computer program, and a computer program product for providing a complementary virtual keyboard of a virtual input device in a virtual environment.

BACKGROUND

Virtual input devices, such as optical virtual keyboards allow input of characters without the need for physical keys. The human interaction with the virtual keyboard occurs mostly via a touchscreen interface, but can also take place in a different form in virtual or augmented reality. In this respect, optical virtual input devices are configured to optically detect and analyze human hand and finger motions and interpret them as operations on a physically non-existent input device, such as like a surface with painted or projected keys on a virtual keyboard. In that way optical virtual devices can emulate unlimited types of manually operated input devices (such as a mouse, keyboard, and other devices). Further, a projection keyboard is a form of optical virtual input device whereby the image of a virtual keyboard is projected onto a surface. When a user touches the surface covered by an image of a key, the input device records the corresponding keystroke. Further, some optical virtual input devices are based on combinations of laser and tactile sensors where finger-on-projected-area in combination with micro-vibration detection are considered. For example, a projected finger tap detected simultaneously with a tap-rendered vibration is indicative of a key stroke. Mechanical input units can thereby be replaced by such virtual input devices, potentially optimized for a specific application and for the user's physiology, maintaining speed, simplicity and unambiguity of manual data input.

Further, using the example of a virtual keyboard as virtual input device, some virtual keyboards have a rather limited size. A consequence of this is that the virtual keyboard might only have a limited amount of virtual keys. Otherwise, the virtual keys might become so small that user interaction, for example in the form of a user typing on the virtual keys of the virtual keyboard becomes difficult. In this respect, there might be a risk that it cannot be determined which virtual key the user intends to touch, or otherwise interact with, when the virtual keys become too small. One way to solve this is to either have some virtual keys representing one or more symbols, or allowing the user to change between virtual keyboards with different sets of virtual keys. FIG. 1 provides two examples of this in terms of virtual keys 124*a* representing numerical symbols. At (a) is illustrated a first virtual keyboard 120 comprising virtual keys 122*a* and where virtual keys 124*a* representing numerical symbols "0", "1", . . . , "9" are provided along a row of the virtual keyboard 120. Possibly, the virtual keys 124*a* at the same time further represent other symbols, such as "!", "#", "a", etc. in addition to the numerical symbols. This requires a so-called shift operation to be used to distinguish between the different symbols represented by one and the same virtual key 124*a*. At (b) is illustrated a second virtual keyboard 120 comprising virtual keys 122*b* and where a dedicated virtual key 124*b* (denoted "SYM") is provided to give the user access to a complementary virtual keyboard, such as a numerical keyboard, or the like. Upon having detected that the user has touched, or otherwise interacted with, the dedicated virtual key 124*b*, a complementary virtual keyboard with additional symbols is then revealed, replacing the original virtual keyboard 120. Virtual keys, for example representing the numerical symbols "0", "1", . . . , "9", are then provided on the complementary virtual keyboard.

In the first example it could be cumbersome for the user to select the intended symbol of the virtual key when at least some of the virtual keys at the same time represent two or more symbols. In the second example it could be cumbersome for the user to select symbols that are not displayed on the virtual keyboard 120.

SUMMARY

An object of embodiments herein is to address the above issues and to provide techniques that quickly and accurately can reveal a complementary virtual keyboard.

According to a first aspect there is presented a method for providing a complementary virtual keyboard of a virtual input device in a virtual environment. The virtual input device is a virtual keyboard comprising virtual keys. The method is performed by a control device. The method comprises identifying user interaction with the virtual input device. The user interaction comprises at least one hand of the user interacting with the virtual input device in the virtual environment. The method comprises calculating a virtual representation of the user interaction with the virtual input device. The method comprises identifying, from the virtual representation, that the user interaction comprises the hand of the user is turned so that a palm side of the hand faces away from the virtual keyboard. The method comprises, in response thereto, revealing the complementary virtual keyboard for receiving user input from the user in the virtual environment.

According to a second aspect there is presented a control device for providing a complementary virtual keyboard of a virtual input device in a virtual environment. The virtual input device is a virtual keyboard comprising virtual keys. The control device comprises processing circuitry. The processing circuitry is configured to cause the control device to identify user interaction with the virtual input device. The user interaction comprises at least one hand of the user interacting with the virtual input device in the virtual environment. The processing circuitry is configured to cause the control device to calculate a virtual representation of the user interaction with the virtual input device. The processing circuitry is configured to cause the control device to identify, from the virtual representation, that the user interaction comprises the hand of the user is turned so that a palm side of the hand faces away from the virtual keyboard. The processing circuitry is configured to cause the control device to, in response thereto, reveal the complementary virtual keyboard for receiving user input from the user in the virtual environment.

According to a third aspect there is presented a control device for providing a complementary virtual keyboard of a virtual input device in a virtual environment. The virtual input device is a virtual keyboard comprising virtual keys. The control device comprises processing circuitry. The control device comprises an identify module configured to identify user interaction with the virtual input device. The user interaction comprises at least one hand of the user interacting with the virtual input device in the virtual environment. The control device comprises a calculate module configured to calculate a virtual representation of the user interaction with the virtual input device. The control device comprises an identify module configured to identify, from the virtual representation, that the user interaction comprises the hand of the user is turned so that a palm side of the hand faces away from the virtual keyboard. The control device comprises a reveal module configured to, in response thereto, reveal the complementary virtual keyboard for receiving user input from the user in the virtual environment.

According to a fourth aspect there is presented a communication device. The communication device comprises a control device according to the third or fourth aspect.

According to a fifth aspect there is presented a system. The system comprises a control device according to the third or fourth aspect. The system further comprises user interface device. The user interface device comprises a projection module for making the virtual input device visible on a surface, and a sensor for sensing the user interaction of the user with the virtual input device.

According to a sixth aspect there is presented a computer program for providing a complementary virtual keyboard of a virtual input device in a virtual environment, the computer program comprising computer program code which, when run on a control device, causes the control device to perform a method according to the first aspect.

According to a seventh aspect there is presented a computer program product comprising a computer program according to the sixth aspect and a computer readable storage medium on which the computer program is stored. The computer readable storage medium could be a non-transitory computer readable storage medium.

Advantageously, these aspects enable the reception of accurate user input for revealing the complementary virtual keyboard to be simplified.

Advantageously, these aspects enable the complementary virtual keyboard to be intuitively, quickly, accurately, and dynamically revealed.

Advantageously, these aspects enable the complementary virtual keyboard to be revealed without the user needing to move the hand used for interacting with the complementary virtual keyboard.

Advantageously, these aspects do not require the need for the user to remember any keyboard shortcuts, or so-called "hot keys", for the complementary virtual keyboard to be revealed.

Advantageously, these aspects do not require the need for having one or more physical buttons on a physical input device for revealing the complementary virtual keyboard.

In some embodiments, the complementary virtual keyboard is revealed by being rendered at a palm of the hand that is turned.

In some embodiments, the complementary virtual keyboard comprises complementary virtual keys, and the method further comprises: determining, from the virtual representation, a size of the palm of the hand that is turned; and determining a size of the complementary virtual keys as a function of the size of the palm of the hand that is turned.

In some embodiments, rendering of the virtual keyboard is continued whilst the complementary virtual keyboard is rendered.

In some embodiments, the complementary virtual keyboard is revealed by being rendered where the virtual keyboard is rendered, or next to where the virtual keyboard is rendered.

In some embodiments, rendering of the virtual keyboard is terminated whilst the complementary virtual keyboard is rendered.

In some embodiments, the method further comprises: identifying, from the virtual representation, further user interaction that comprises fingers of the hand that is turned performing a first predetermined motion; and in response thereto: altering rendering of the complementary virtual keyboard according to a predetermined rule.

In some embodiments, the method further comprises: identifying, from the virtual representation, further user interaction that comprises fingers of the hand that is turned performing a second predetermined motion being a reverse motion of the first predetermined motion; and in response thereto: reverting said altering rendering of the complementary virtual keyboard.

In some embodiments, the method further comprises: identifying, from the virtual representation, further user interaction that comprises the hand of the user being turned so that the palm side of the hand faces away from the complementary virtual keyboard; and in response thereto: terminating rendering of the complementary virtual keyboard.

In some embodiments, the complementary virtual keyboard defines any of: a numerical keyboard, functional keys, application-specific short keys.

In some embodiments, the virtual keyboard defines a first numerical keyboard and the complementary virtual keyboard defines a second numerical keyboard, and wherein the second numerical keyboard is an extension of the first numerical keyboard.

In some embodiments, the user interaction with the virtual input device is performed whilst a software application is run in the virtual environment, and the method further comprises: identifying, according to a predefined criterion, that the complementary virtual keyboard corresponds to the software application; and in response thereto: providing, in the virtual environment, an indication to the user that the complementary virtual keyboard is available and/or an indication of a manoeuvre needed to be made by the user for the complementary virtual keyboard to be revealed.

In some embodiments, the user interaction is identified from information obtained from at least one sensor configured to track hand and finger movement of the user in relation to the virtual input device in the virtual environment.

In some embodiments, the virtual environment is an extended reality virtual environment.

In some embodiments, the virtual environment is either an augmented reality virtual environment, a virtual reality virtual environment, or a mixed reality virtual environment.

In some embodiments, the control device is part of, or integrated with, a communication device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

Moreover, the term "comprising" followed by statements of technical features or method steps should be understood as not excluding the presence of other technical features of method steps not stated in appended claims.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to mechanisms for providing a complementary virtual keyboard of a virtual input device in a virtual environment. In order to obtain such mechanisms there is provided a control device, a method performed by the control device, a computer program product comprising code, for example in the form of a computer program, that when run on a control device, causes the control device to perform the method.

Figure 2:
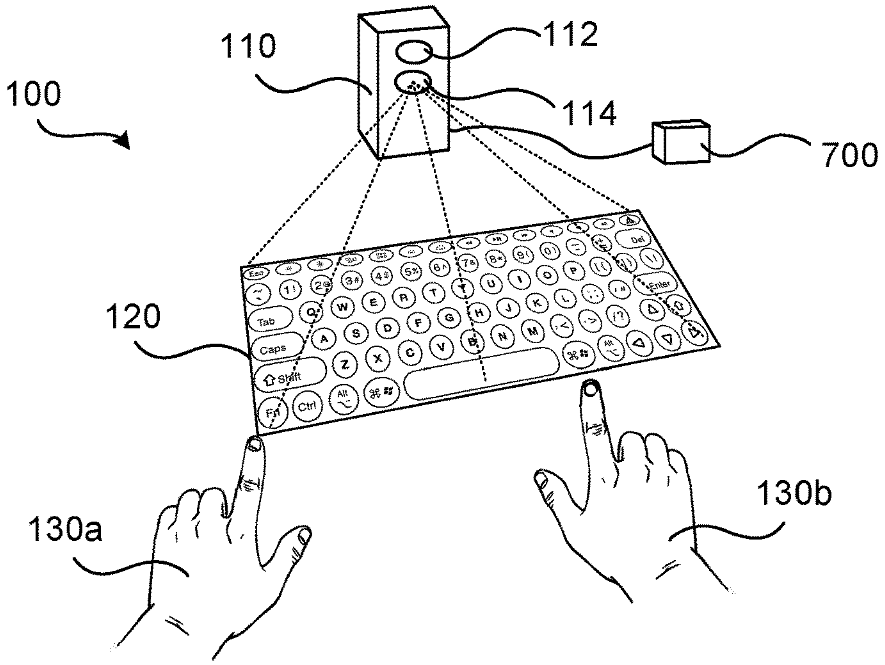
FIG. 2 is a schematic diagram illustrating a system according to embodiments.

FIG. 2 is a schematic diagram of a system 100. The system 100 comprises a user interface device 110 and a control device 700. The user interface device 110 and the control device 700 are operatively connected to each other. In some implementations, the control device 700 is part of, or integrated with, the user interface device 110. In some implementations, the control device 700 is part of, or integrated with, a communication device, such as a mobile phone, tablet computer, or the like.

Figure 1:
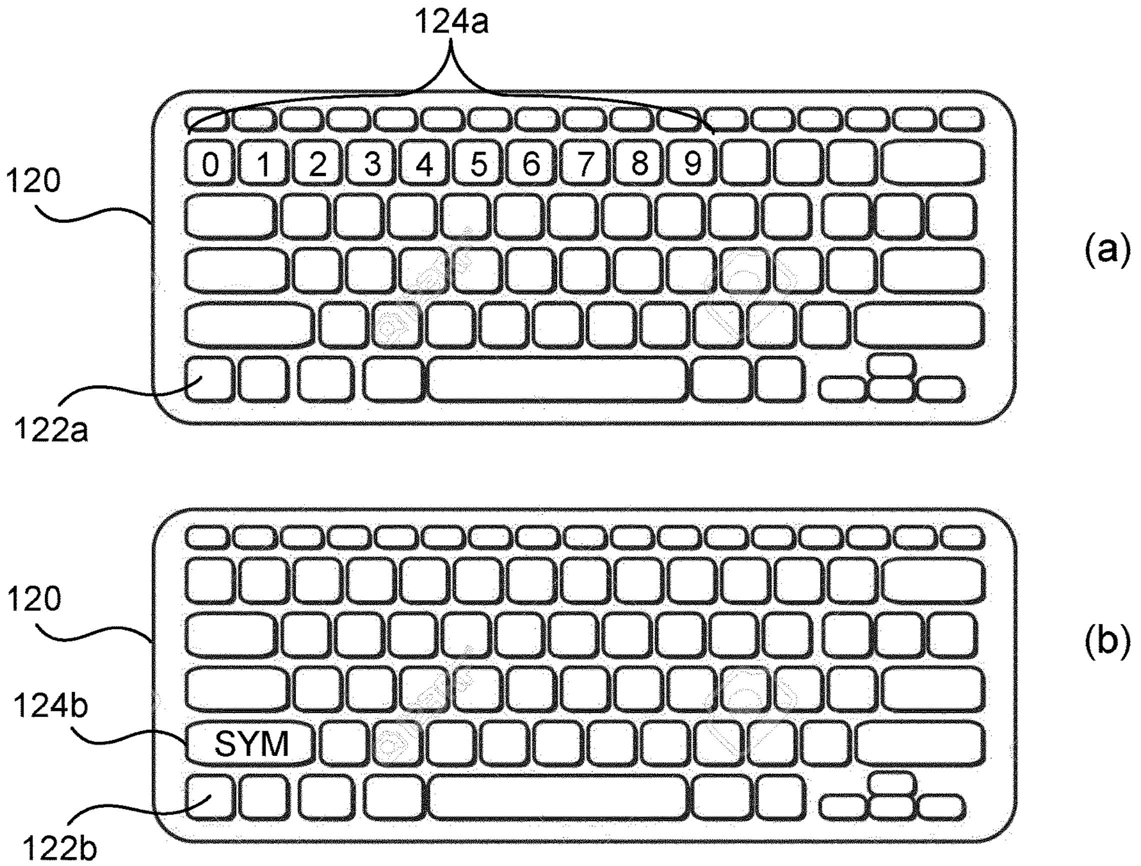
FIG. 1 illustrates virtual keyboards according to examples.

The user interface device 110 comprises a projection module 114 for making a virtual input device visible on a surface. The virtual input device is a virtual keyboard 120 that comprises virtual keys 122*a*, 122*b*, 124*a*, 124*b* (as in FIG. 1). The user interface device 110 further comprises a sensor 112 for sensing user interaction of a user with the virtual input device 120 at coordinates along the surface. The sensor 112 could be a radar module, a lidar module, a camera module, or the like. In some examples, the sensor 112 is an inertial measurement unit (IMU) and is provided on gloves, or other piece of garment, worn by the user. Hence, the functionality of the user interface device 110 might be split between at least two physical devices. Further, also combinations of different types of sensors 112 are possible.

In FIG. 2 the user is schematically represented by two hands 130*a*, 130*b*. Software converts the coordinates to identify actions or characters put in by the user. To this end, the control device 700 calculates a virtual representation of the user interaction with the virtual keyboard 120. The virtual representation and the virtual keyboard 120 define parts of a virtual environment. There could be different types of virtual environments. In some non-limiting examples, the virtual environment is an extended reality (XR) virtual environment. In further non-limiting examples, the virtual environment is either an augmented reality (AR) virtual environment, a virtual reality (VR), virtual environment, or a mixed reality (MR) virtual environment. Hence, although the user interface device 110 in FIG. 2 is illustrated as a stand-alone device, the user interface device 110 could be part of a headset (such as a VR headset), or wearable computer glasses (such as AR glasses, or smart glasses).

Figure 3:
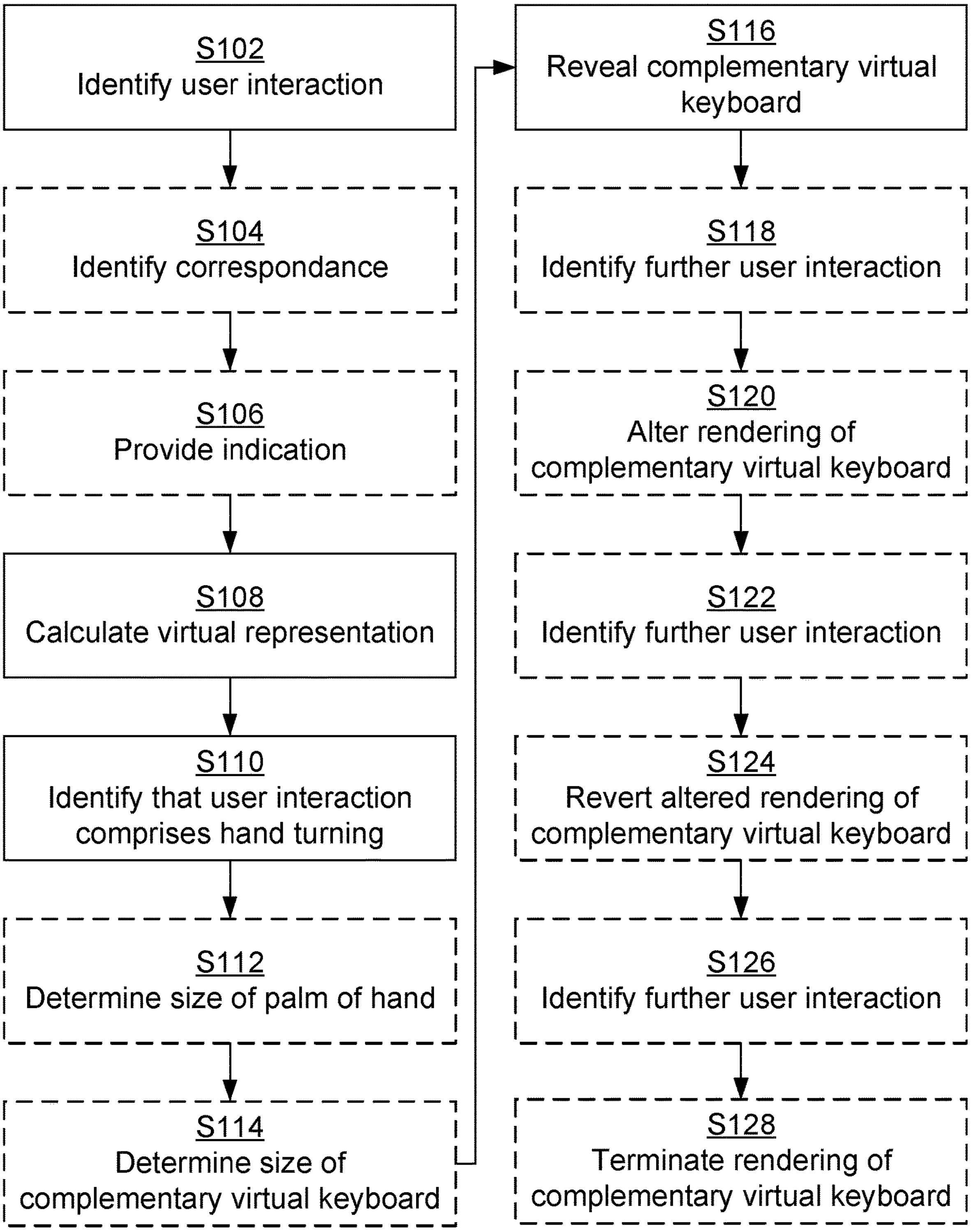
FIGS. 3 and 6 are flowcharts of methods according to embodiments.
Figure 4:
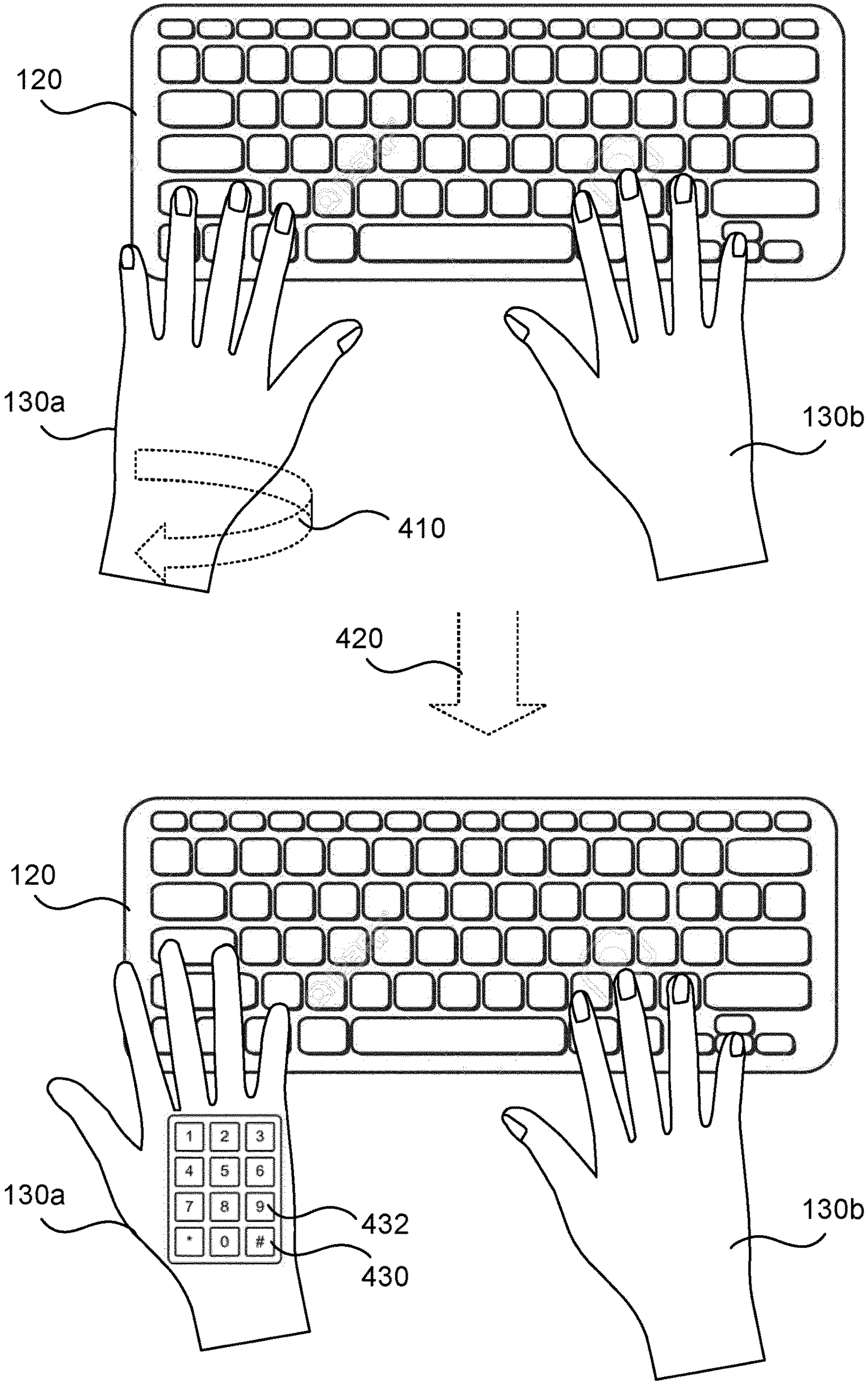
FIGS. 4 and 5 schematically illustrate user interaction with a virtual input device being a virtual keyboard according to embodiments.
Figure 5:
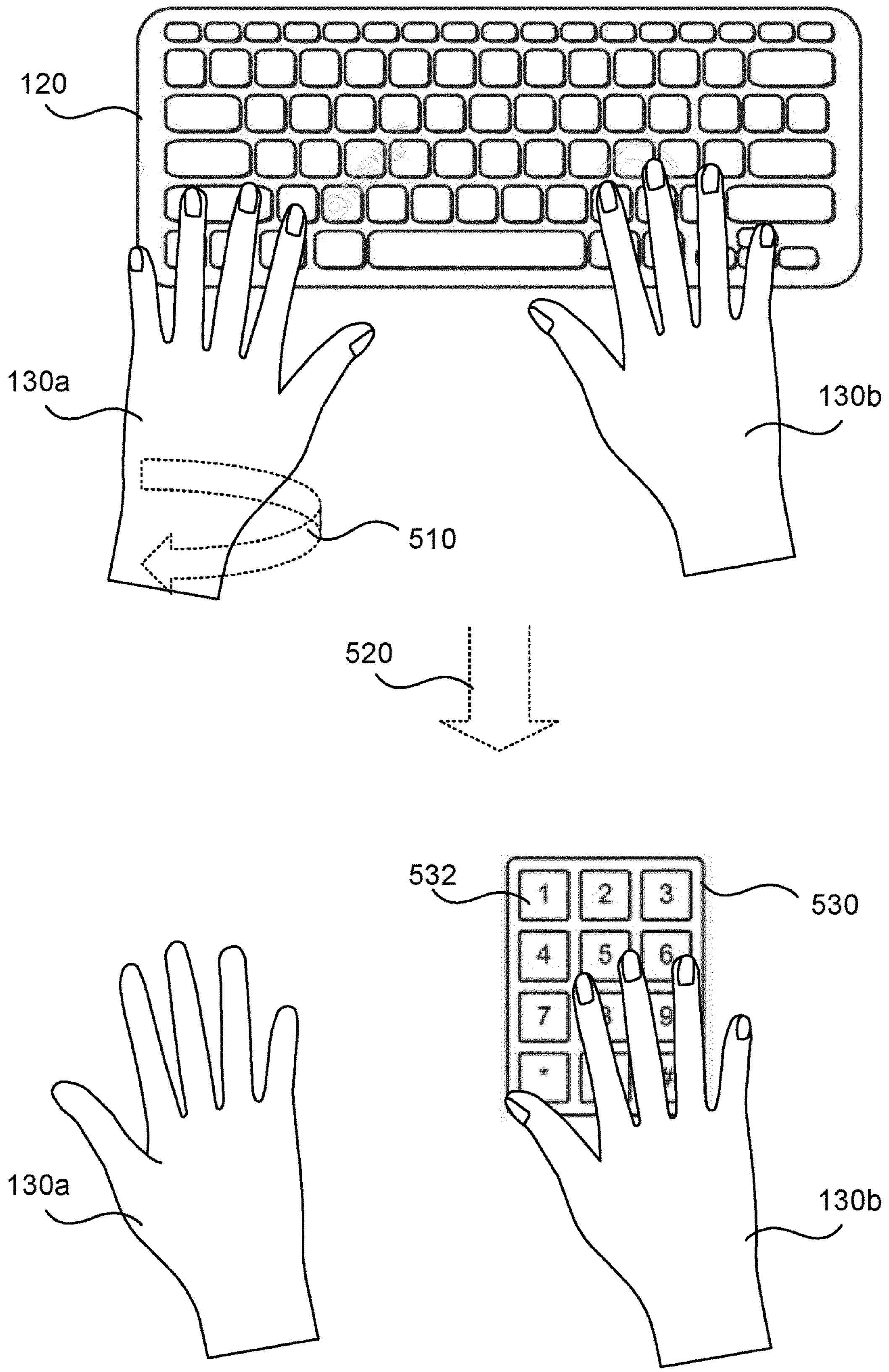

Parallel reference will next be made to FIG. 3, FIG. 4, and FIG. 5 for disclosure of how to provide a complementary virtual keyboard of the virtual input device in a virtual environment. The virtual input device is a virtual keyboard 120 comprising virtual keys 122*a*, 122*b*, 124*a*, 124*b*. FIG. 3 is a flowchart illustrating embodiments of methods for providing a complementary virtual keyboard 430, 530 of a virtual input device in a virtual environment. The methods are performed by the control device 700. The methods are advantageously provided as computer programs 920. FIG. 4 schematically illustrates user interaction with a virtual keyboard 120 according to a first example. FIG. 5 schematically illustrates user interaction with a virtual keyboard 120 according to a second example.

S102: The control device 700 identifies user interaction with the virtual input device. The user interaction comprises at least one hand 130*a* of the user interacting with the virtual input device in the virtual environment. This user interaction with the virtual input device is schematically illustrated in the top parts of FIG. 4 and FIG. 5 where the hands 130*a*, 130*b* of the user are typing on the virtual keyboard 120.

S108: The control device 700 calculates a virtual representation of the user interaction with the virtual input device. Examples of how the virtual representation can be calculated will be disclosed below.

S110: The control device 700 identifies, from the virtual representation, that the user interaction comprises the hand 130*a* of the user being turned so that a palm side of the hand 130*a* faces away from the virtual keyboard 120. This turning of the hand 130*a* is in FIG. 4 and FIG. 5 schematically represented by arrow 410 and arrow 510. As is understood, although it is in FIG. 4 and FIG. 5 shown that the user moves her/his left hand 130*a* (as indicated by arrow 410 and arrow 510), it could likewise be that it is the right hand 130*b* of the user being that is turned so that a palm side of the hand 130*b* faces away from the virtual keyboard 120.

S116: The control device 700, in response thereto (i.e., in response to S110 and as schematically indicated by arrow 420 and arrow 520), reveals the complementary virtual keyboard 430, 530 for receiving user input from the user in the virtual environment. This is shown in the bottom parts of FIG. 4 and FIG. 5. Different ways in which the complementary virtual keyboard 420, 530 can be revealed will be disclosed below.

Embodiments relating to further details of providing a complementary virtual keyboard 430, 530 of a virtual input device in a virtual environment as performed by the control device 700 will now be disclosed.

In some aspects, an indication is provided to the user that rendering of the complementary virtual keyboard 430, 530 is possible. In particular, in some embodiments, the user interaction with the virtual input device is performed whilst a software application is run in the virtual environment, and the control device 700 is configured to perform (optional) steps S104 and S106: S104: The control device 700 identifies, according to a predefined criterion, that the complementary virtual keyboard 430, 530 corresponds to the software application.

There could be different such predefined criteria. For example, one predefined criterion (e.g., when the software application is associated with input of numerical symbols) could be that the user is frequently touching, or otherwise interacting with, virtual keys representing numerical symbols on the (original) virtual keyboard 120 dedicated to common text input and there is a complementary virtual keyboard 430, 530 available that is a dedicated numerical keyboard. For example, one predefined criterion could be that the user is frequently touching, or otherwise interacting with, virtual keys representing certain functional keys on the (original) virtual keyboard 120 dedicated to common text input and there is a complementary virtual keyboard 430, 530 available that is dedicated to such functional keys. For example, one predefined criterion could be that the user is frequently touching, or otherwise interacting with, virtual keys representing application-specific short keys on the (original) virtual keyboard 120 dedicated to common text input and there is a complementary virtual keyboard 430, 530 available that is dedicated to such application-specific short keys.

S106: The control device 700, in response thereto (i.e., in response to S104), provides, in the virtual environment, an indication to the user that the complementary virtual keyboard 430, 530 is available and/or an indication of a manoeuvre needed to be made by the user for the complementary virtual keyboard 430, 530 to be revealed.

There could be different such indications that are provided to the user. Non-limiting examples thereof are movie clips or graphical overlays illustrating how the user is enabled to cause the complementary virtual keyboard 430, 530 to be revealed.

There could be different ways to identify that the user interaction comprises the hand 130*a* of the user being turned so that a palm side of the hand 130*a* faces away from the virtual keyboard 120 in S110. In some aspects, sensors 112 are configured to track the virtual representation of the user. In particular, in some embodiments, the user interaction is identified from information obtained from at least one sensor 112 configured to track hand and finger movement of the user in relation to the virtual input device in the virtual environment.

There may be different ways for the control device 700 to reveal the complementary virtual keyboard 430, 530 in S116. Different embodiments relating thereto will now be described in turn.

In some aspects, the complementary virtual keyboard 430, 530 is rendered in the palm of the hand 130*a* that is turned. Particularly, in some embodiments, the complementary virtual keyboard 430, 530 is revealed by being rendered at a palm of the hand 130*a* that is turned. This is shown in FIG. 4.

In some aspects, the size of the complementary virtual keyboard 430, 530 is matched to the size of the palm of the hand 130*a* that is turned. In particular, in some embodiments, the complementary virtual keyboard 430, 530 comprises complementary virtual keys 432, 532, and the control device 700 is configured to perform (optional) steps S112 and S114: S112: The control device 700 determines, from the virtual representation, the size of the palm of the hand 130*a* that is turned.

S114: The control device 700 determines the size of the complementary virtual keys 432, 532 as a function of the size of the palm of the hand 130*a* that is turned.

In some aspects, the (original) virtual keyboard 120 is kept as is under the hand 130*b* that is not turned.

Particularly, in some embodiments, rendering of the virtual keyboard 120 is continued whilst the complementary virtual keyboard 430, 530 is rendered. This is shown in FIG. 4. In some examples, the virtual keyboard 120 is then rendered to be transparent or shaded.

In some aspects, the complementary virtual keyboard 430, 530 is rendered under the other hand 130*b*.

Particularly, in some embodiments, the complementary virtual keyboard 430, 530 is revealed by being rendered where the virtual keyboard 120 is rendered, or next to where the virtual keyboard 120 is rendered. This is shown in FIG. 5.

In some aspects, the complementary virtual keyboard 430, 530 replaces the (original) virtual keyboard 120 under the hand 130*b* that is not turned. Particularly, in some embodiments, rendering of the virtual keyboard 120 is terminated whilst the complementary virtual keyboard 430, 530 is rendered. This is shown in FIG. 5.

There might be different actions, operations, or steps, performed by the control device 700 upon having revealed the complementary virtual keyboard 430, 530 for receiving user input from the user in the virtual environment in S116.

In some aspects, the control device 700 is configured to cause an alternation of the complementary virtual keyboard 430, 530 to be revealed upon the user having performed a second motion (e.g. closing the fingers together). In particular, in some embodiments, the control device 700 is configured to perform (optional) steps S118 and S120:

S118: The control device 700 identifies, from the virtual representation, further user interaction. This further user interaction comprises fingers of the hand 130*a* that is turned performing a first predetermined motion.

S120: The control device 700, in response thereto (i.e., in response to S118), alters rendering of the complementary virtual keyboard 430, 530 according to a predetermined rule (e.g., closing the fingers together).

In some aspects, the control device 700 is configured to a reversion back to the complementary virtual keyboard 430, 530 upon the user having performed the reverse of the second motion (e.g. again spreading the fingers). In particular, in some embodiments, the control device 700 is configured to perform (optional) steps S122 and S124:

S122: The control device 700 identifies, from the virtual representation, further user interaction. This further user interaction comprises fingers of the hand 130*a* that is turned performing a second predetermined motion being a reverse motion of the first predetermined motion (e.g., again spreading the fingers).

S124: The control device 700, in response thereto (i.e., in response to S122), reverts the altered rendering of the complementary virtual keyboard 430, 530.

As is understood, S118-S124 provide only some examples of further user interaction, and there might be additional, or alternative further user interaction to those further user interactions disclosed in S118-S124.

Hence, the control device 700 might be configured to reveal a respective complementary virtual keyboard in set of complementary virtual keyboards, where each of these complementary virtual keyboards might be associated with its own further user interaction, or where each of these complementary virtual keyboards are cyclically and in turn revealed.

In some aspects, the control device 700 is configured to cause a reversion back to the (original) virtual keyboard 120 upon the user having performed the reverse of the first motion i.e., turns the hand 130*a* such that the palm-side again is down-facing. In particular, in some embodiments, the control device 700 is configured to perform (optional) steps S126 and S128:

S126: The control device 700 identifies, from the virtual representation, further user interaction. This further user interaction comprises the hand 130*a* of the user being turned so that the palm side of the hand 130*a* faces away from the complementary virtual keyboard 430, 530.

S128: The control device 700, in response thereto (i.e., in response to S126), terminates rendering of the complementary virtual keyboard 430, 530.

There might be different examples of complementary virtual keyboards 430, 530. In some non-limiting examples, complementary virtual keyboard 430, 530 defines any of: a numerical keyboard (as in FIG. 4 and FIG. 5), functional keys, application-specific short keys. Non-limiting examples where such functional keys and/or application-specific short keys might be used are multimedia (such as image, sound, and/or video) editing applications, gaming applications, etc. In other non-limiting examples, the virtual keyboard 120 defines a first numerical keyboard and the complementary virtual keyboard 430, 530 defines a second numerical keyboard, where the second numerical keyboard is an extension of the first numerical keyboard. For example, the first numerical keyboard might comprise numerical values and basic mathematical operators, such as addition, subtraction, multiplication, and division, whereas the second numerical keyboard in addition thereto comprises advanced mathematical operators, such as logarithms, exponents, trigonometric functions, etc.

Figure 6:
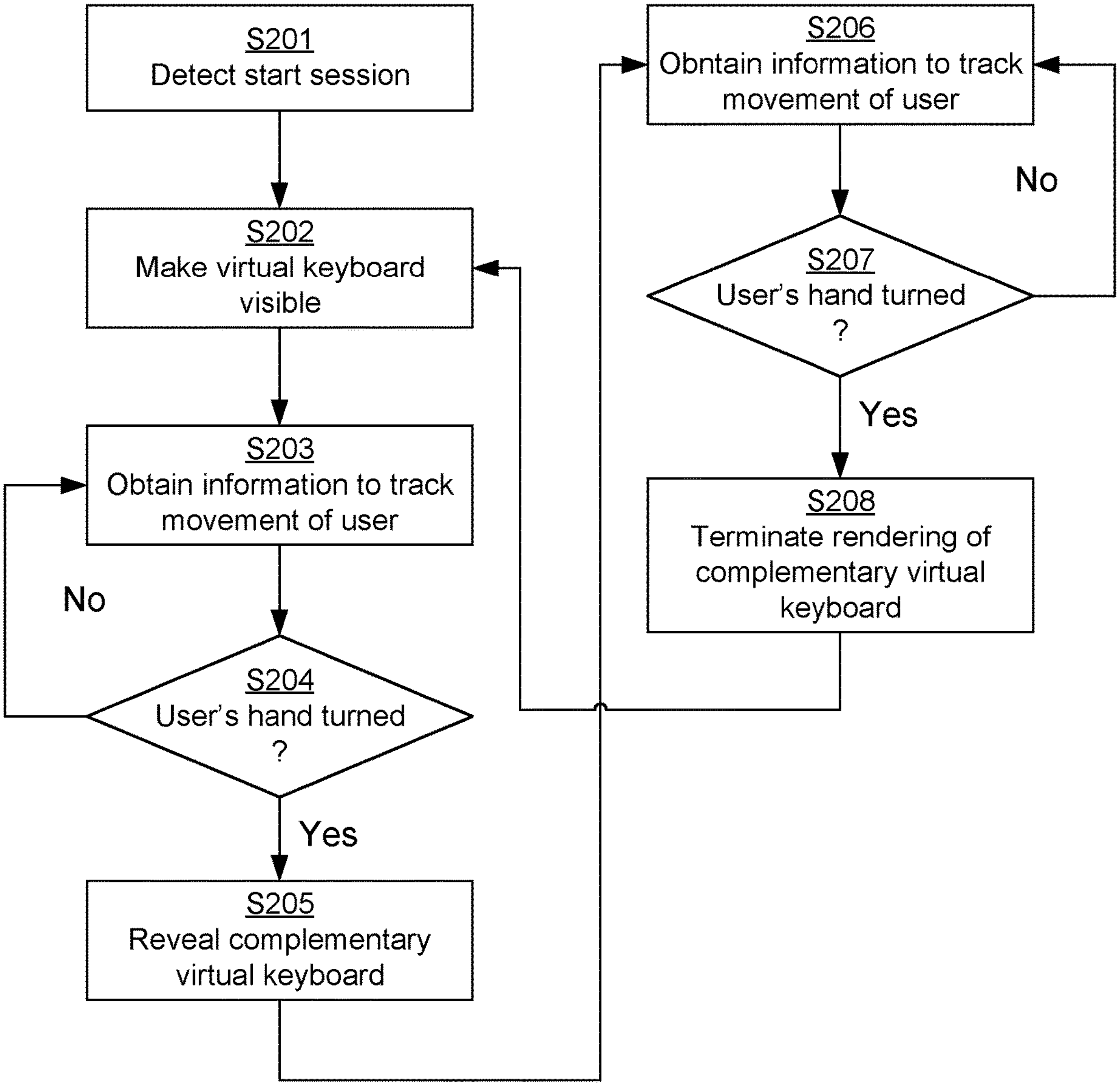

FIG. 6 is a flowchart of a method for providing a complementary virtual keyboard 430, 530 of a virtual input device in a virtual environment, where the virtual input device is a virtual keyboard 120 comprising virtual keys 122*a*, 122*b*, 124*a*, 124*b*, as performed by a control device 700 according to at least some of the above disclosed embodiments, aspects, and examples.

S201: The control device 700 detects that the user intends to start a session with the virtual input device.

S202: The control device 700 instructs the user interface device 110 to make the virtual keyboard 120 visible.

S203: The control device 700 obtains information from the sensor 112 that enables the control device 700 to track movement of the hands 130*a*, 130*b* and fingers of the user. The control device 700 thereby obtains information about user input defining a user interaction with the virtual keyboard 120 in the virtual environment and calculates a virtual representation of the user interaction with the virtual keyboard 120.

S204: The control device 700 identifies, from the virtual representation, whether the user interaction comprises one hand 130*a* of the user being turned so that a palm side of the hand 130*a* faces away from the virtual keyboard 120.

S205: The control device 700 reveals the complementary virtual keyboard 430, 530 for receiving user input from the user in the virtual environment, e.g., as in FIG. 4 or FIG. 5.

S206: The control device 700 obtains information from the sensor 112 that enables the control device 700 to continue tracking the movement of the hands 130*a*, 130*b* and fingers of the user. The control device 700 thereby obtains information about user input defining a user interaction with the complementary virtual keyboard 430, 530 and updates the virtual representation of the user interaction.

S207: The control device 700 identifies, from the virtual representation, whether the user interaction comprises the hand 130*a* of the user being turned so that the palm side of the hand 130*a* faces away from the complementary virtual keyboard 430, 530.

S208: The control device 700 terminates the rendering of the complementary virtual keyboard 430, 530.

Figure 7:
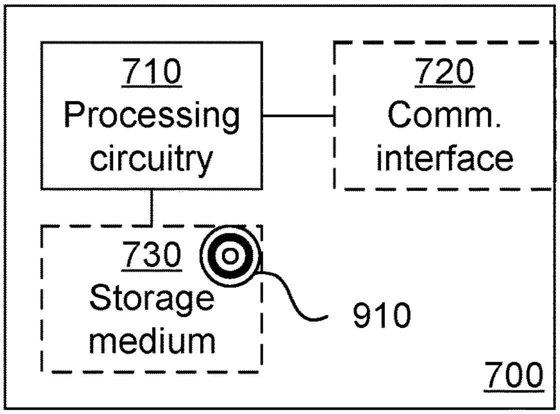
FIG. 7 is a schematic diagram showing functional units of a control device according to an embodiment.

FIG. 7 schematically illustrates, in terms of a number of functional units, the components of a control device 700 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the control device 700 to perform a set of operations, or steps, as disclosed above. For example, the storage medium 230 may store the set of operations, and the processing circuitry 210 may be configured to retrieve the set of operations from the storage medium 230 to cause the control device 700 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The control device 700 may further comprise a communications interface 220 at least configured for communications with other entities, functions, nodes, and devices. As such the communications interface 220 may comprise one or more transmitters and receivers, comprising analogue and digital components. The processing circuitry 210 controls the general operation of the control device 700 e.g. by sending data and control signals to the communications interface 220 and the storage medium 230, by receiving data and reports from the communications interface 220, and by retrieving data and instructions from the storage medium 230. Other components, as well as the related functionality, of the control device 700 are omitted in order not to obscure the concepts presented herein.

Figure 8:
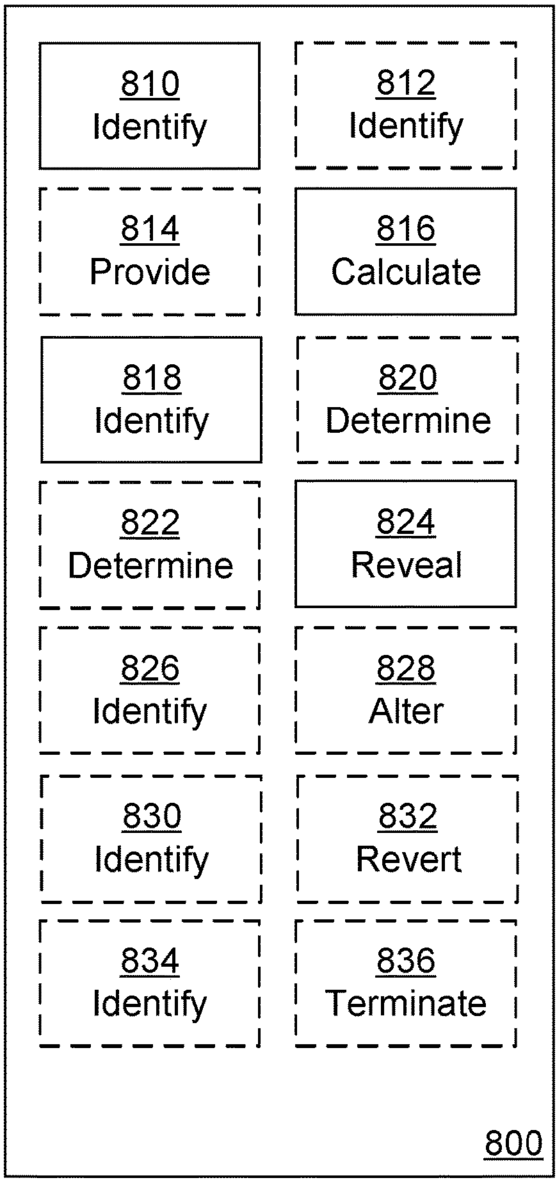
FIG. 8 is a schematic diagram showing functional modules of a control device according to an embodiment.

FIG. 8 schematically illustrates, in terms of a number of functional modules, the components of a control device 700 according to an embodiment. The control device 700 of FIG. 8 comprises a number of functional modules; an identify module 810 configured to perform step S102, calculate module 816 configured to perform step S108, an identify module 818 configured to perform step S110, and a reveal module 824 configured to perform step S116. The control device 700 of FIG. 8 may further comprise a number of optional functional modules, such as any of an identify module 812 configured to perform step S104, a provide module 814 configured to perform step S106, a determine module 820 configured to perform step S112, a determine module 822 configured to perform step S114, an identify module 826 configured to perform step S118, an alter module 828 configured to perform step S120, an identify module 830 configured to perform step S122, a revert module 832 configured to perform step S124, an identify module 834 configured to perform step S126, and a terminate module 836 configured to perform step S128.

In general terms, each functional module 810:836 may in one embodiment be implemented only in hardware and in another embodiment with the help of software, i.e., the latter embodiment having computer program instructions stored on the storage medium 230 which when run on the processing circuitry makes the control device 700 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 810:836 may be implemented by the processing circuitry 210, possibly in cooperation with the communications interface 220 and/or the storage medium 230. The processing circuitry 210 may thus be configured to from the storage medium 230 fetch instructions as provided by a functional module 810:836 and to execute these instructions, thereby performing any steps as disclosed herein.

A first portion of the instructions performed by the control device 700 may be executed in a first device, and a second portion of the of the instructions performed by the control device 700 may be executed in a second device; the herein disclosed embodiments are not limited to any particular number of devices on which the instructions performed by the control device 700 may be executed. Hence, the methods according to the herein disclosed embodiments are suitable to be performed by a control device 700 residing in a cloud computational environment. Therefore, although a single processing circuitry 210 is illustrated in FIG. 7 the processing circuitry 210 may be distributed among a plurality of devices, or nodes.

Figure 9:
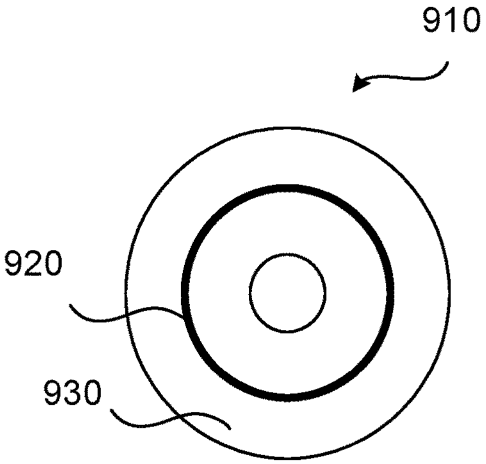
FIG. 9 shows one example of a computer program product comprising computer readable storage medium according to an embodiment.

The same applies to the functional modules 810:836 of FIG. 8 and the computer program 920 of FIG. 9.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for providing a complementary virtual keyboard of a virtual input device in a virtual environment, wherein the virtual input device is a virtual keyboard comprising virtual keys, the method being performed by a control device, the method comprising:

rendering the virtual keyboard on a physical surface, for typing interaction by a user;

identifying user interaction with the virtual input device, the user interaction comprising at least one hand of the user interacting with the virtual input device in the virtual environment;

calculating a virtual representation of the user interaction with the virtual input device;

identifying, from the virtual representation, that the user interaction comprises one hand of the user being turned so that a palm side of the one hand faces away from the virtual keyboard; and in response thereto:

revealing the complementary virtual keyboard on the physical surface next to the virtual keyboard, for receiving user input from the other hand of the user.

2. The method according to claim 1, wherein the complementary virtual keyboard comprises virtual keys that are complementary with respect to the virtual keys of the virtual keyboard.

3. The method according to claim 1, wherein the method further comprises:

identifying, from the virtual representation, that the hand turned away from the virtual keyboard is moved such that the palm again faces the virtual keyboard and, in response, terminating the rendering of the complementary virtual keyboard.

4. The method according to claim 1, wherein the complementary virtual keyboard defines any of: a numerical keyboard, functional keys, application-specific short keys.

5. The method according to claim 1, wherein the virtual keyboard defines a first numerical keyboard and the complementary virtual keyboard defines a second numerical keyboard, and wherein the second numerical keyboard is an extension of the first numerical keyboard.

6. The method according to claim 1, wherein the user interaction with the virtual input device is performed whilst a software application is run in the virtual environment, and wherein the method further comprises:

identifying, according to a predefined criterion, that the complementary virtual keyboard corresponds to the software application; and in response thereto:

providing, in the virtual environment, an indication to the user that the complementary virtual keyboard is available and/or an indication of a manoeuvre needed to be made by the user for the complementary virtual keyboard to be revealed.

7. The method according to claim 1, wherein the user interaction is identified from information obtained from at least one sensor configured to track hand and finger movement of the user in relation to the virtual input device in the virtual environment.

8. The method according to claim 1, wherein the virtual environment is an extended reality (XR) virtual environment.

9. The method according to claim 1, wherein the virtual environment is either an augmented reality (AR) virtual environment, a virtual reality (VR) virtual environment, or a mixed reality (MR) virtual environment.

10. The method according to claim 1, wherein the control device is part of, or integrated with, a communication device.

11. A control device for providing a complementary virtual keyboard of a virtual input device in a virtual environment, wherein the virtual input device is a virtual keyboard comprising virtual keys, the control device comprising processing circuitry, the processing circuitry being configured to cause the control device to:

render the virtual keyboard on a physical surface, for typing interaction by a user;

identify user interaction with the virtual input device, the user interaction comprising at least one hand of the user interacting with the virtual input device in the virtual environment;

calculate a virtual representation of the user interaction with the virtual input device;

identify, from the virtual representation, that the user interaction comprises one hand of the user being turned so that a palm side of the one hand faces away from the virtual keyboard; and in response thereto:

reveal the complementary virtual keyboard on the physical surface next to the virtual keyboard, for receiving user input from the other hand of the user.

12. A communication device comprising the control device according to claim 11.

13. A system comprising the control device according to claim 11, and a user interface device, wherein the user interface device comprises a projection module for rendering the virtual keyboard on the physical surface, and a sensor for sensing the user interaction of the user with the virtual input device.

14. A control device comprising:

a projection module;

a sensor; and processing circuitry configured to:

control the projection module to project a virtual keyboard onto a physical surface;

detect, via the sensor, movement of the hands of the user, including detecting typing inputs by the user to the virtual keyboard; and responsive to detecting the user turning one hand away from the virtual keyboard, control the projection module to project a complementary virtual keyboard onto the physical surface, on a side of the virtual keyboard that corresponds with the other hand of the user.

* * * * *